US009923910B2

(12) United States Patent
Di Pietro et al.

(10) Patent No.: US 9,923,910 B2
(45) Date of Patent: Mar. 20, 2018

(54) DYNAMIC INSTALLATION OF BEHAVIORAL WHITE LABELS

(71) Applicant: Cisco Technology, Inc., San Jose, CA (US)

(72) Inventors: Andrea Di Pietro, Lausanne (CH); Jean-Philippe Vasseur, Anchorage, AK (US); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 14/874,591

(22) Filed: Oct. 5, 2015

(65) Prior Publication Data

US 2017/0099309 A1    Apr. 6, 2017

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC .............................. H04L 63/14; G06N 99/005
See application file for complete search history.

(56) References Cited

U.S. PATENT DOCUMENTS

| 7,324,108 | B2 | 1/2008 | Hild et al. |
| 7,406,606 | B2 | 7/2008 | Chawla et al. |
| 8,151,341 | B1 | 4/2012 | Gudov et al. |
| 8,719,935 | B2 | 5/2014 | Polyakov et al. |
| 8,782,790 | B1 | 7/2014 | Smith et al. |
| 2004/0054505 | A1 | 3/2004 | Lee |
| 2007/0300302 | A1* | 12/2007 | Morin ............... G08B 29/22 726/23 |
| 2015/0193696 | A1 | 7/2015 | Vasseur et al. |

OTHER PUBLICATIONS

Sajassi, et al., "BGP MPLS Based Ethernet VPN", Network Working Group Internet Draft, draft-ietf-l2vpn-evpn-11, Oct. 18, 2014, 52 pages, Internet Engineering Task Force Trust.

* cited by examiner

*Primary Examiner* — Izunna Okeke
(74) *Attorney, Agent, or Firm* — Parker Ibrahim & Berg LLC; James M. Behmke; Stephen D. LeBarron

(57) ABSTRACT

In one embodiment, a device in a network analyzes data regarding a detected anomaly in the network. The device determines whether the detected anomaly is a false positive. The device generates a white label for the detected anomaly based on a determination that the detected anomaly is a false positive. The device causes one or more alerts regarding the detected anomaly to be suppressed using the generated white label for the anomaly.

17 Claims, 13 Drawing Sheets

DYNAMIC INSTALLATION OF BEHAVIORAL WHITE LABELS

TECHNICAL FIELD

The present disclosure relates generally to computer networks, and, more particularly, to the dynamic installation of behavioral white labels in a network.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
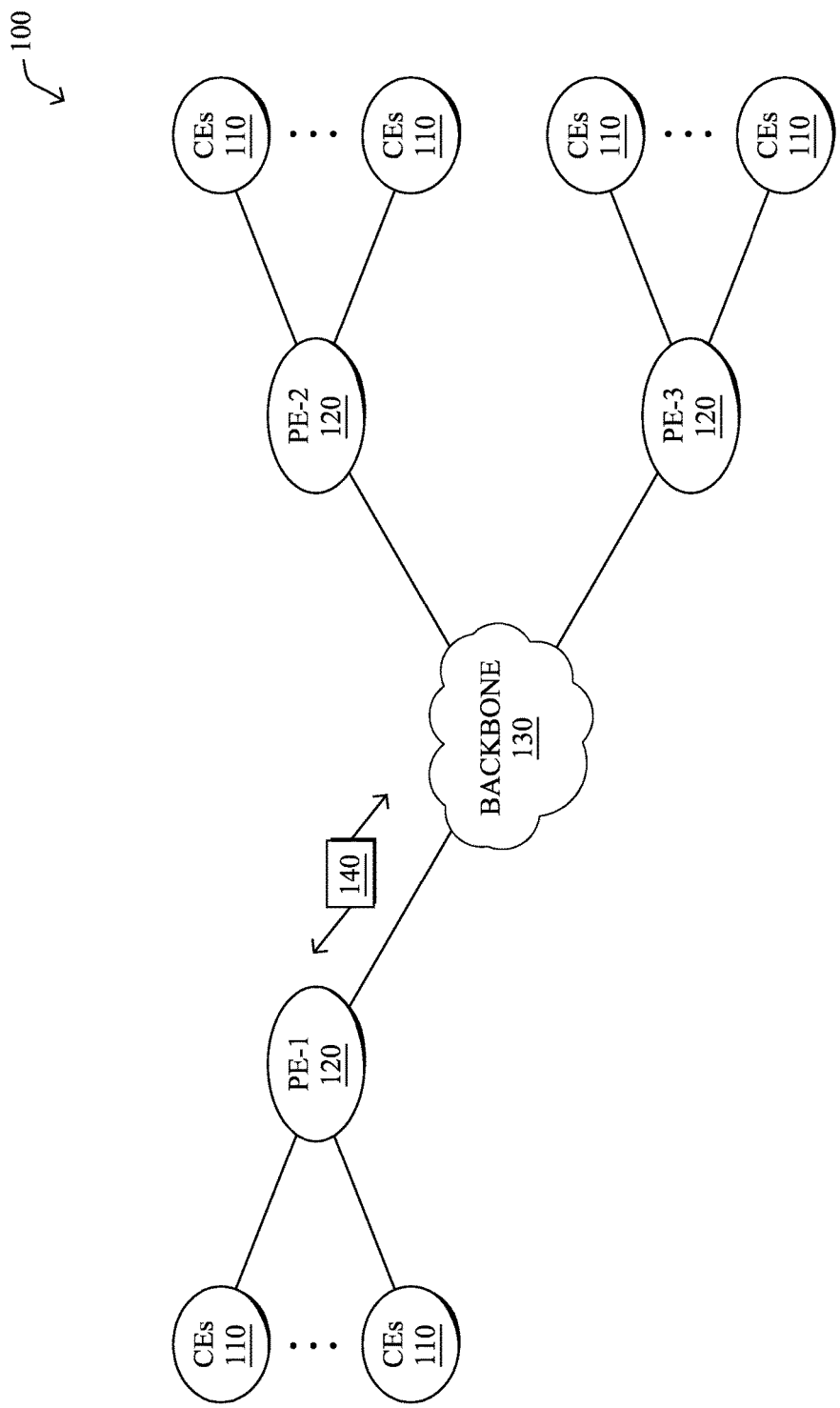
FIGS. 1A-1B illustrate an example communication network.

According to one or more embodiments of the disclosure, a device in a network analyzes data regarding a detected anomaly in the network. The device determines whether the detected anomaly is a false positive. The device generates a white label for the detected anomaly based on a determination that the detected anomaly is a false positive. The device causes one or more alerts regarding the detected anomaly to be suppressed using the generated white label for the anomaly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
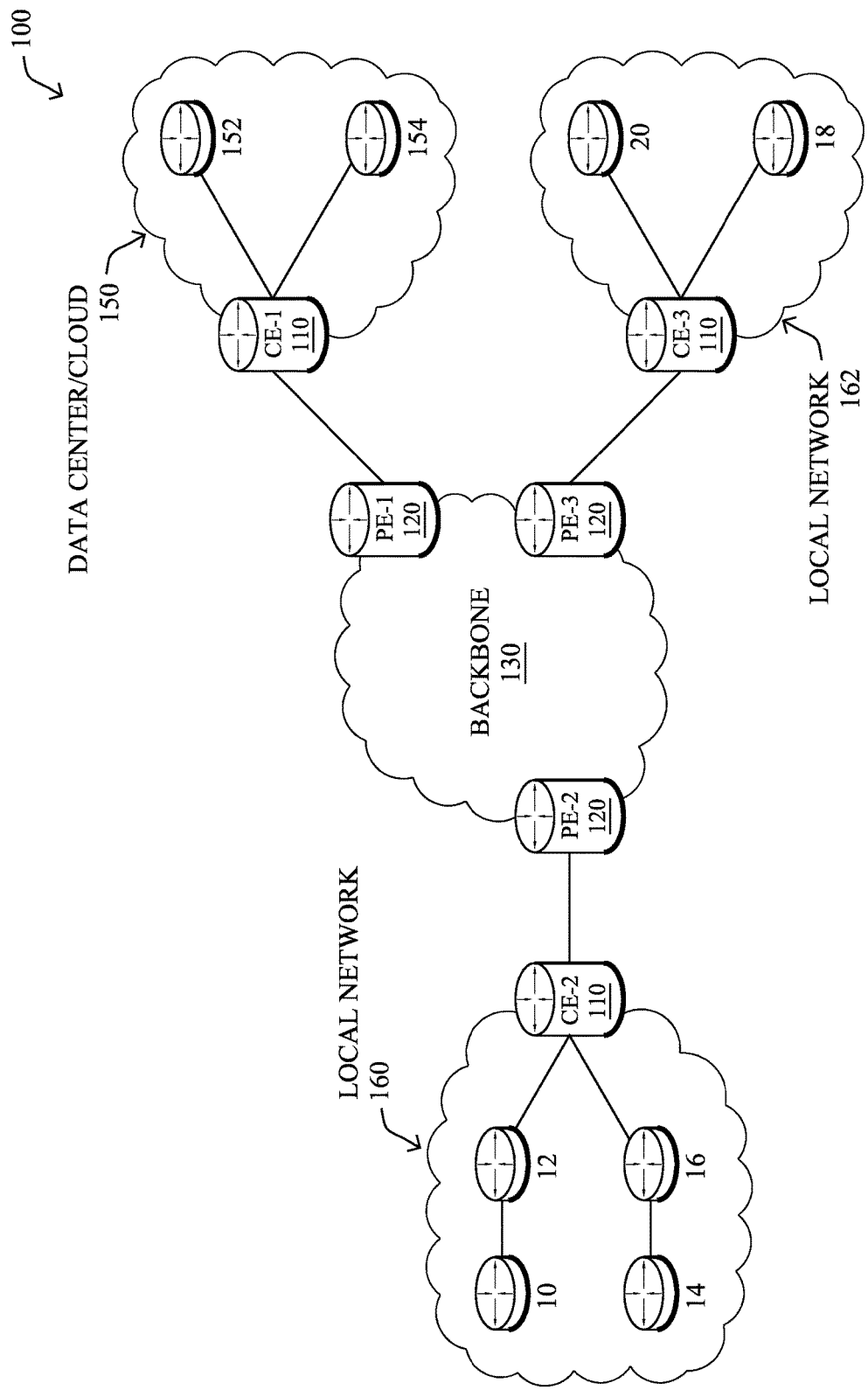

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
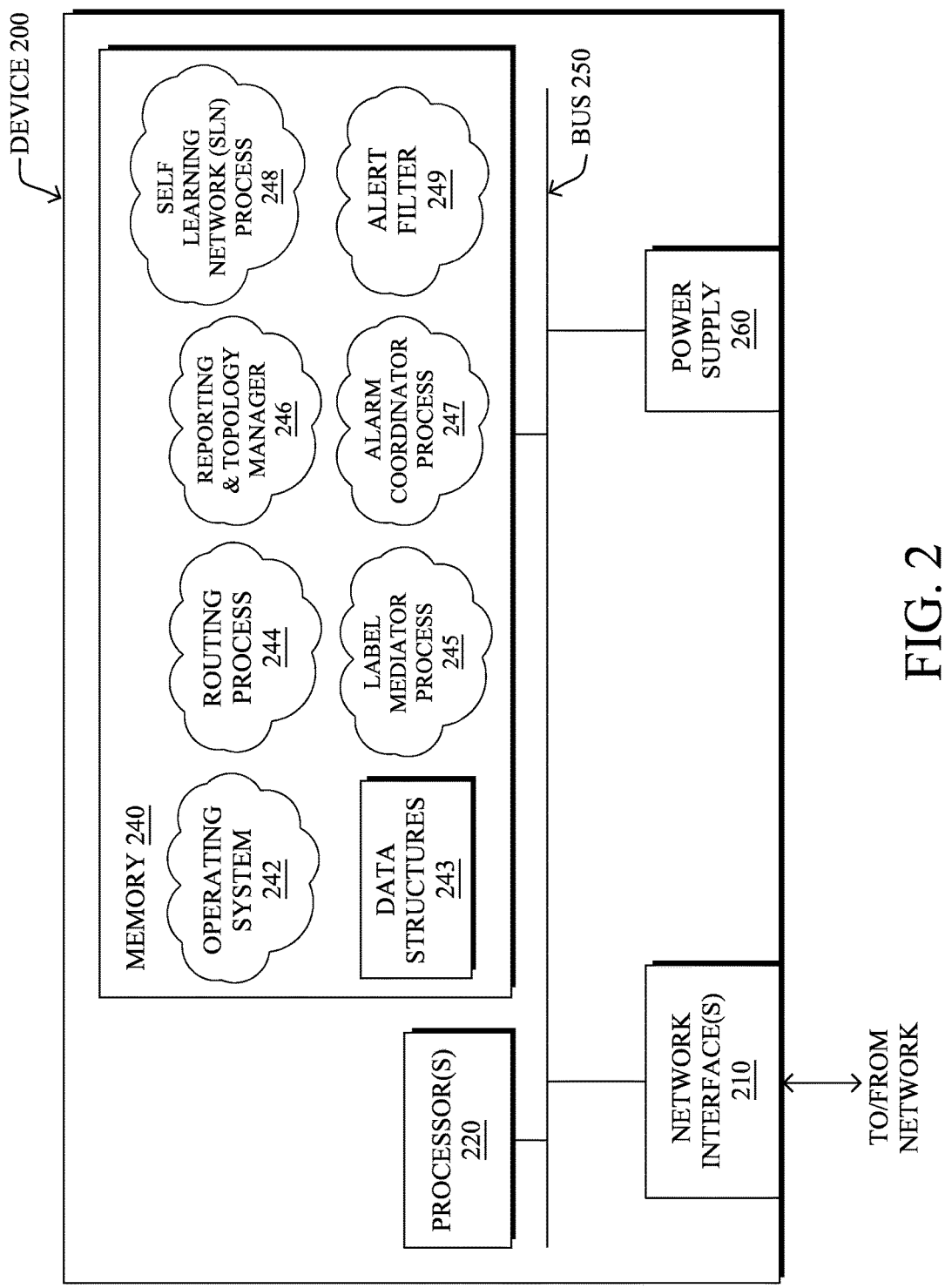
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 243. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a label mediator process 245, a reporting and topology manager process 246, an alarm coordinator process 247, a self learning network (SLN) process 248, and/or an alert filter process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic blackhole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
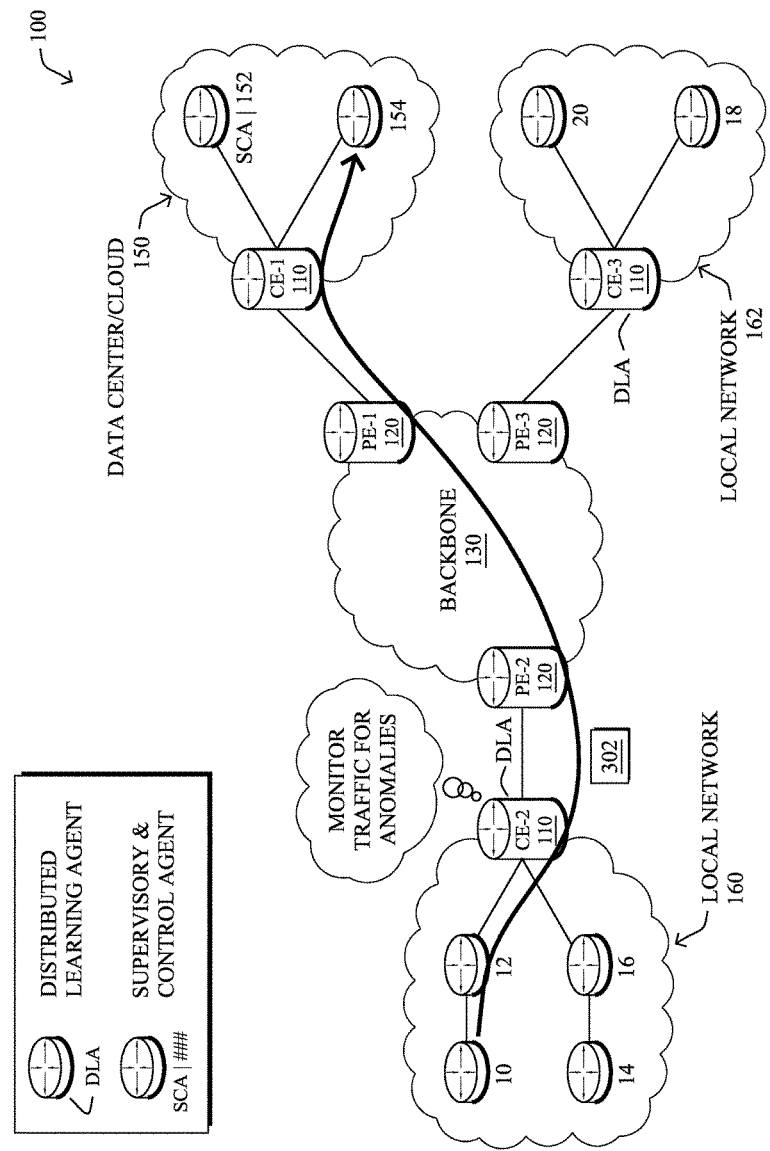
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be configured to monitor network conditions (e.g., router states, traffic flows, etc.), perform anomaly detection on the monitored data using one or more machine learning models, report detected anomalies to the SCA, and/or perform local mitigation actions. Similarly, an SCA may be configured to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Anomalies such as DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, machine learning may be adapted for use in a computer network as part of an anomaly detection system. However, there are many cases in which a machine learning-based anomaly detector may require feedback from an expert, such as a network administrator. Notably, such an anomaly detector may flag a number of network behaviors that are "unusual," but not malicious, as anomalous. For example, a new application performing an update for the first time may be flagged as an anomaly, until the anomaly detector model is able to learn that the behavior is normal. In such cases, feedback regarding the anomaly may be used to prevent the detector from continually flagging the otherwise valid behavior as anomalous.

Dynamic Installation of Behavioral White Labels

The techniques herein provide mechanisms to prevent the continuous flagging of unusual, but completely legitimate, network behaviors as anomalous through the use of white labels. In some aspects, an expert (e.g., a user, etc.) may be alerted when a particular network behavior is flagged as anomalous by a deployed anomaly detector. If the expert determines that the behavior is legitimate, the behavior may be white labeled by creating a "behavioral signature" that allows for the recognition and filtering of the associated alerts. In further aspects, techniques are disclosed that allow for the automatic distribution of an anomaly white label to one or more deployed anomaly detectors. Notably, in massively distributed environments, multiple anomaly detectors may detect the same anomalous behavior. By identifying these devices and distributing the white label to them, repetitive analysis of the same behavior by the expert may be avoided. In another aspect, notifications may be provided to the expert, if multiple alerts are correlated, thereby allowing the expert to determine whether the behavior is truly legitimate.

Specifically, according to one or more embodiments of the disclosure as described in detail below, a device in a network analyzes data regarding a detected anomaly in the network. The device determines whether the detected anomaly is a false positive. The device generates a white label for the detected anomaly based on a determination that the detected anomaly is a false positive. The device causes one or more alerts regarding the detected anomaly to be suppressed using the generated white label for the anomaly.

Illustratively, the techniques described herein may be performed by hardware, software, and/or firmware, such as in accordance with any or all of the processes 245-249 described above. For example, the techniques herein may be treated as extensions to conventional protocols, such as the various PLC protocols or wireless communication protocols, and as such, may be processed by similar components understood in the art that execute those protocols, accordingly.

Figure 4A:
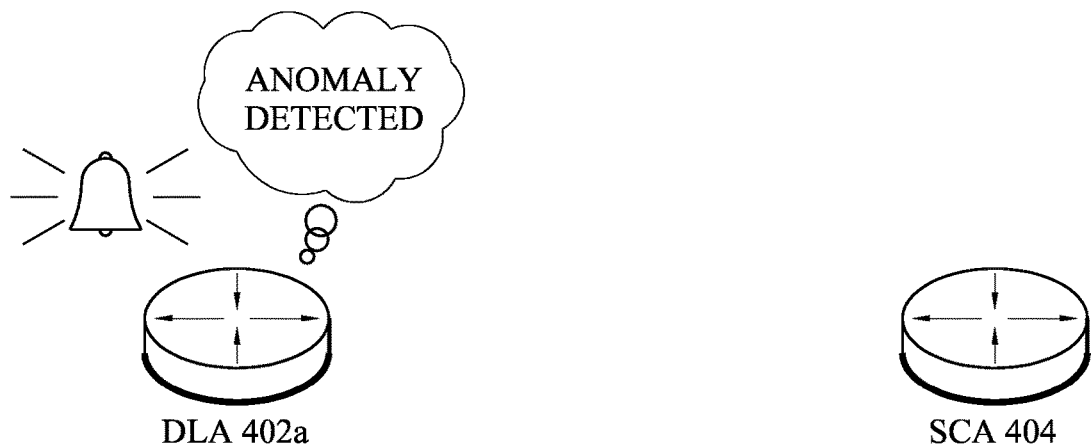
FIGS. 4A-4H illustrate examples of behavioral white labels being used in a network.

Operationally, FIGS. 4A-4H illustrate examples of behavioral white labels being used in a network, according to various embodiments. In various embodiments, a device in the network may be operable to act as a white label mediator (e.g., by executing label mediator process 245). For example, as shown in FIG. 4A, an SCA 404 may be operable to act as a white label mediator and may be on the alarm path for any or all of the DLAs in the network, such as DLA 402a.

Figure 4B:
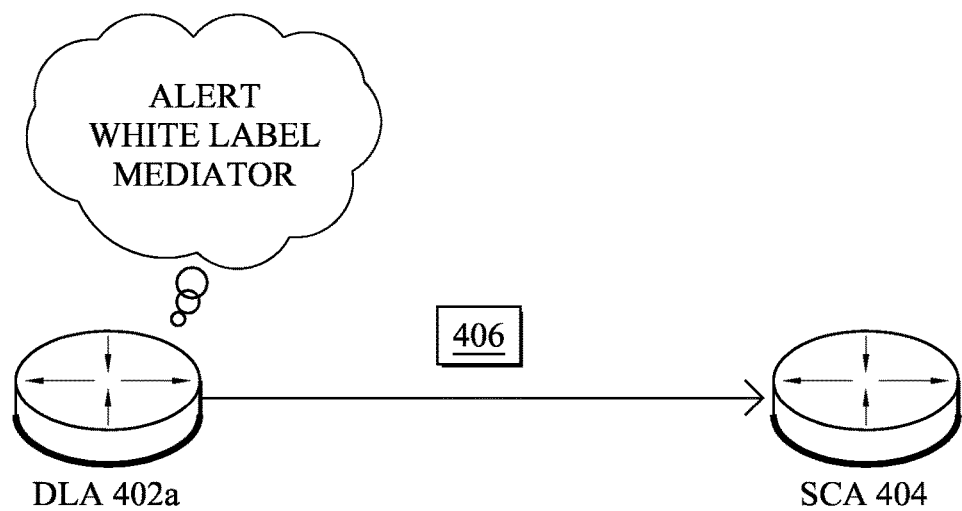

As shown in FIGS. 4A-4B, assume that the machine learning model of DLA 402a detects an anomaly in the observed behavior of the network. In turn, as shown in FIG. 4B, DLA 402a may send an alert message 406 to the white label mediator (e.g., SCA 404) regarding the detected anomaly. In various embodiments, message 406 may identify the detected anomaly, the observed behavior and network conditions that led to the detection, or any other information regarding the detected anomaly.

Figure 4C:

In response to receiving an anomaly detection alert for the first time, the white label mediator may determine whether or not the detected anomaly is a false positive. In other words, the mediator may determine whether the network behavior of the detected anomaly is otherwise legitimate. For example, as shown in FIG. 4C, SCA 404 may determine whether the anomaly detected and reported by DLA 402a is a false positive. In various embodiments, the mediator may determine whether the reported anomaly is a false positive based on an independent analysis of the behavior. For example, the mediator may analyze the behavior using its own machine learning model, based on additional information regarding the behavior (e.g., a scheduled application update or other network event), etc. In further embodiments, the white label mediator may determine whether the detected anomaly is a false positive by providing information regarding the detected anomaly to a user interface and receiving a determination from an expert user in response.

Figure 4D:
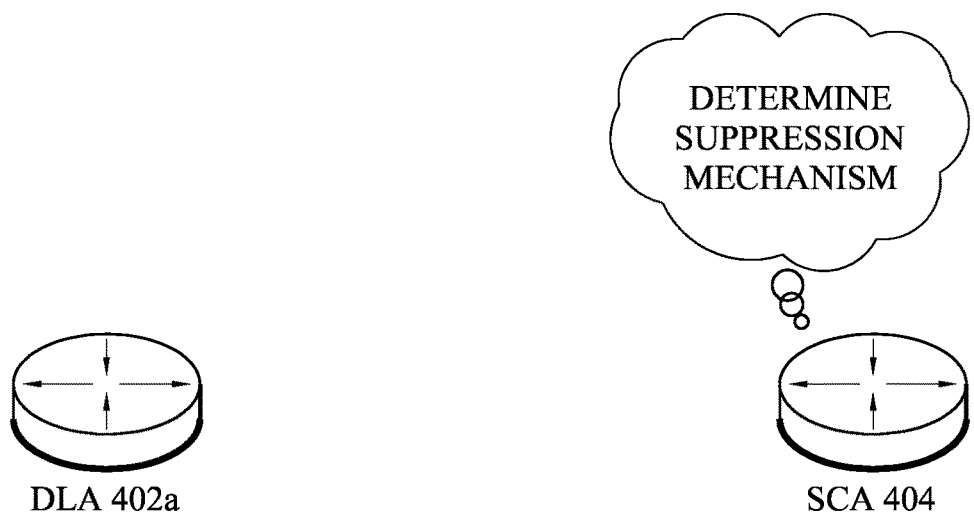

If the white label mediator determines that the reported anomaly is a false positive, it may determine a corresponding suppression mechanism for the anomaly, in various embodiments. For example, as shown in FIG. 4D, if SCA 404 determines that the anomaly detected by DLA 402a is a false positive, it may then determine a suppression mechanism for the anomaly, so that further alerts regarding the anomaly are suppressed in the network.

Generally, a suppression mechanism for a network anomaly may include a white label for the anomaly deemed legitimate by the white label. In some embodiments, a DLA may be configured with a filter process (e.g., alert filter process 249) that filters alerts generated by the local machine learning model of the DLA based on white labels generated by the white label mediator. For example, if the DLA flags a certain network behavior as anomalous, the DLA may compare the detected anomaly to its locally installed white labels, to determine whether to suppress alerts for the detected anomaly.

The suppression mechanism may also include any number of policies that control how the generated white label is to be applied by the alert filter process. For example, the expert user or the white label mediator itself may specify how subsequent alerts matching the white label are to be handled. In another example, the white label mediator may retrieve the policy from an external policy engine in the network. In various embodiments, these policies may include, but are not limited to, any or all of the following:

Totally suppress every alert matching the white label.
Suppress alerts within one or more specified thresholds. For example, alerts may only be suppressed so long as the alert rate remains below a given threshold.
Suppress alerts for a specified time period.
Filter alerts through a central device in the network (e.g., to determine whether alerts from different DLAs are correlated, as described in greater detail below.

Figure 4E:
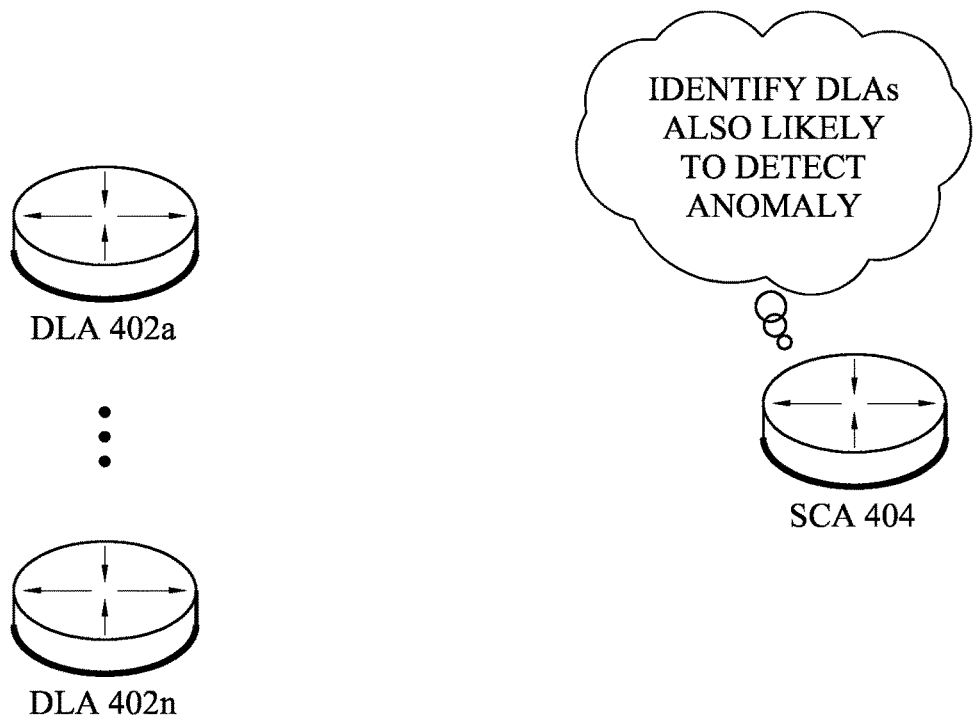
Figure 4F:
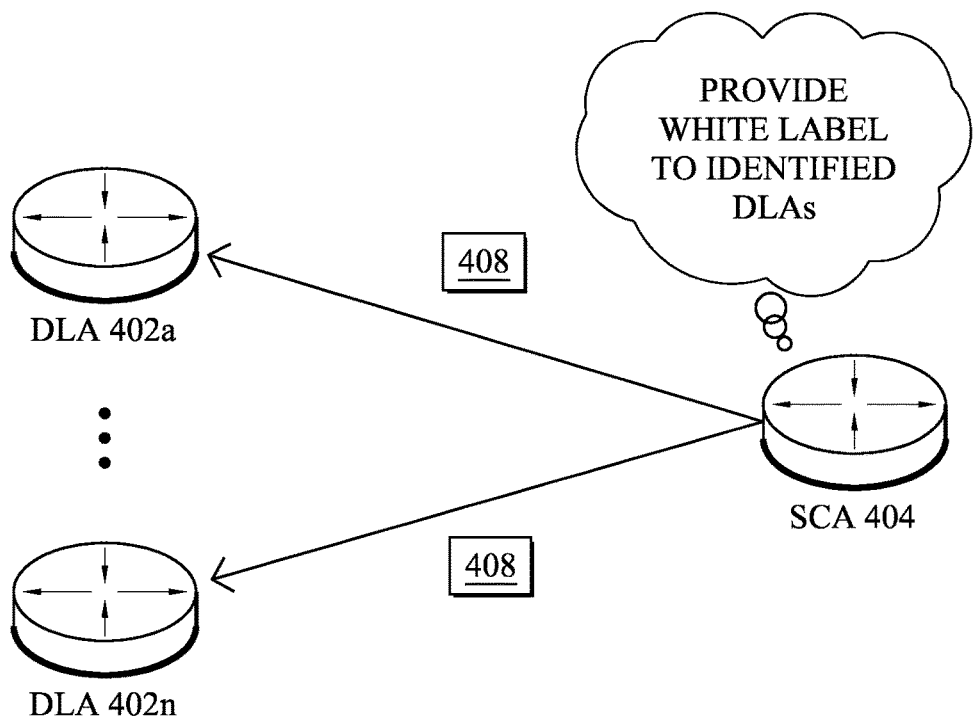

In some embodiments, the white label mediator may identify any number of DLAs that are likely to detect the anomaly that led to the false positive. For example, as shown in FIG. 4E, assume that n-number of DLAs are distributed throughout the network (e.g., a first through nth DLA). In such a case, SCA 404 may identify any number of these DLAs as also likely to encounter the anomaly that led to the false positive alert. In turn, the mediator may send the generated white label and label policy to the identified DLAs. For example, as shown in FIG. 4F, SCA 404 may send messages 408 to any number of DLAs 404a-404n (e.g., a first through nth DLA) that include the white label and/or label policy for the anomaly initially detected by DLA 404a.

Figure 4G:
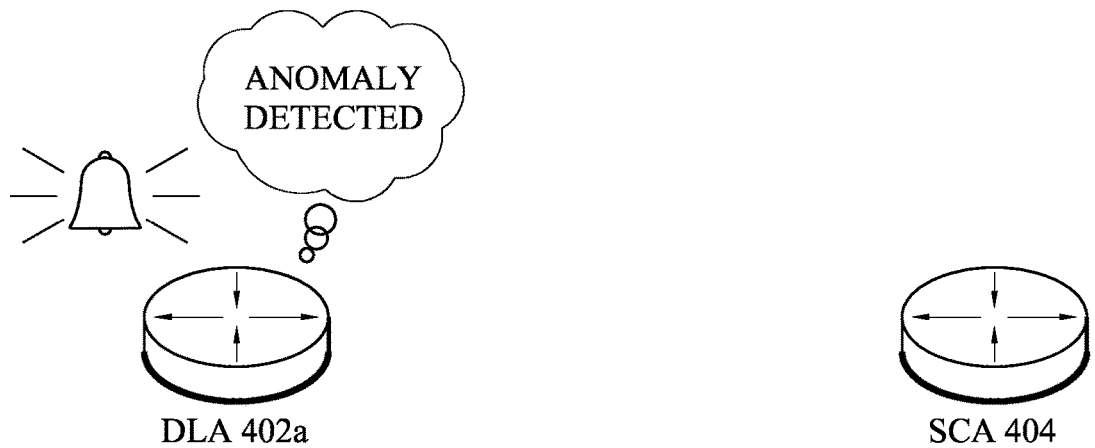
Figure 4H:
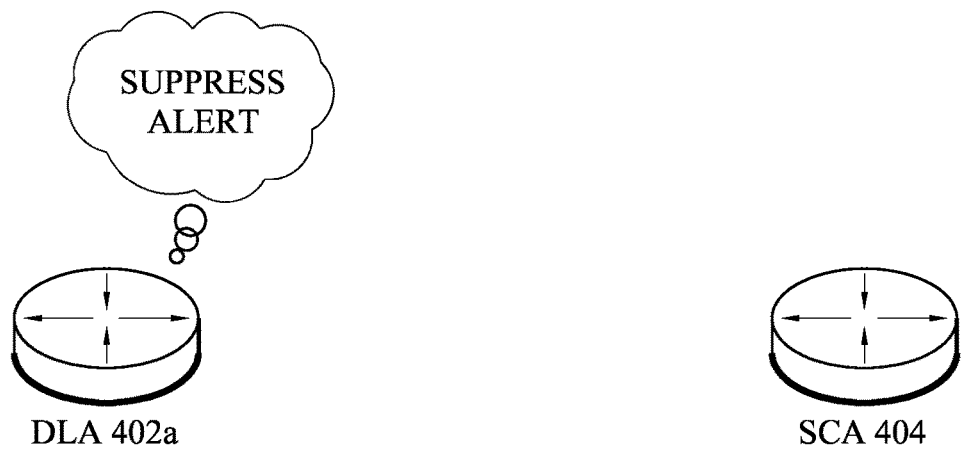

In response to receiving a white label for an anomaly, a DLA may use the white label to suppress further alerts for the anomaly. For example, as shown in FIGS. 4G-4H, assume that DLA 402a again detects the network anomaly originally detected in FIG. 4A. In such a case, as shown in FIG. 4H, DLA 402a may compare the detected anomaly to the white label send by SCA 404 and determine that an alert should not be sent to SCA 404 for the anomaly.

Figure 5A:
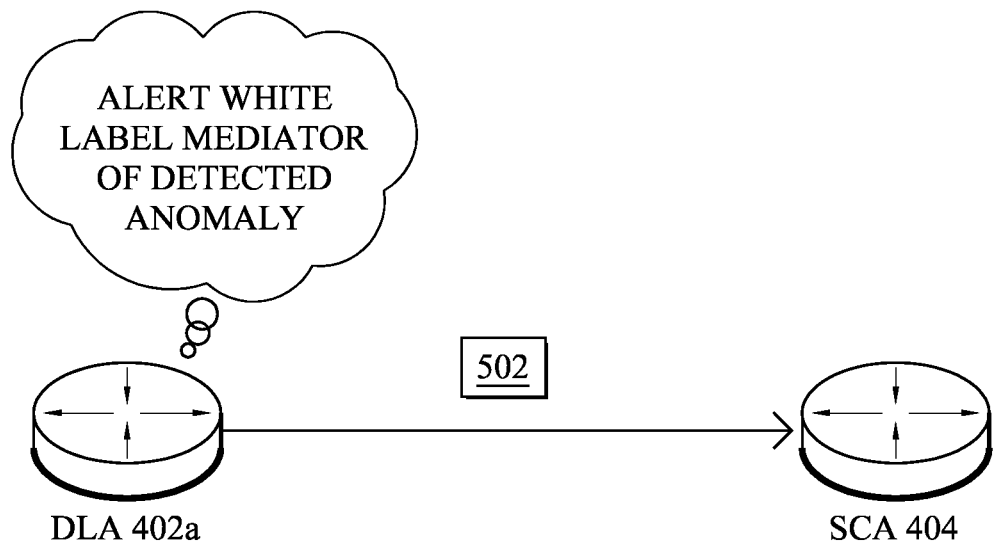
FIGS. 5A-5B illustrate an example of behavioral white labels being applied centrally.
Figure 5B:
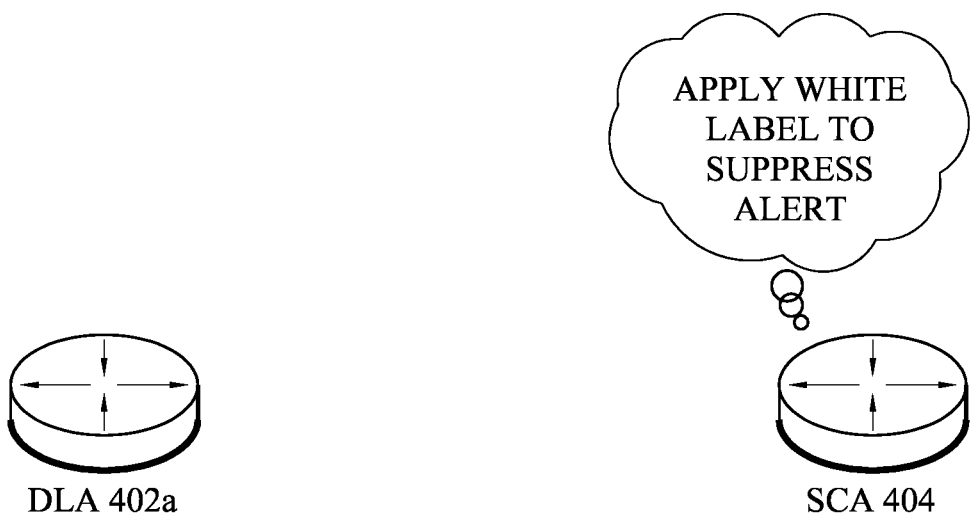

Referring now to FIGS. 5A-5B, an example is shown of behavioral white labels being applied centrally. In some embodiments, a central device in the network may apply a white label, as opposed to one or more of the DLAs in the network. In such cases, the local alert filters on the DLAs may not be used and all anomalies detected by the DLAs may instead be reported to the white label mediator or other centralized device. For example, as shown in FIG. 5A, DLA 402a may send an anomaly alert message 502 to SCA 404 (e.g., the white label mediator), in response to detecting anomalous behavior in the network.

In response to receiving an anomaly alert from a DLA, the centralized device may use its own local alert filter process to determine whether the anomaly has been white labeled. If so, the device may suppress the forwarding of the alert to a user interface and instead store information about the detected anomaly for later analysis. For example, as shown in FIG. 5B, SCA 404 may apply a white label to the anomaly of alert message 502 and simply store information regarding the anomaly for later review by a user. Notably, in some cases, the network administrator may wish to review his or her labeling of the particular anomaly as legitimate by assessing a history of the stored alerts at a later time.

As would be appreciated, in cases of a highly distributed system, a centralized approach to alert filtering may become unscaleable. However, on the other hand, installing a white label filter on all of the distributed DLAs in such a network (e.g., on the order of thousands of devices) may be equally impractical. Thus, a number of mechanisms are also described herein that provide for the installation of a white label filter on only a subset of the DLAs that are of particular relevance with respect to the anomalous condition.

Additionally, if the scale of the system deployment is small enough, a behavioral white label can still be installed on every DLA, in some embodiments. However, as noted above, this approach can become unpractical on large-scale deployments. Moreover, the same behavior can be perfectly legitimate on some nodes, while it could be anomalous on others (e.g., download of an update of a particular application can be normal in a branch, while it could be an anomaly in a data center). Accordingly, the techniques described herein to select only a subset of the DLAs to receive the white label may be equally applicable to small scale deployments, in some cases.

Figure 6A:
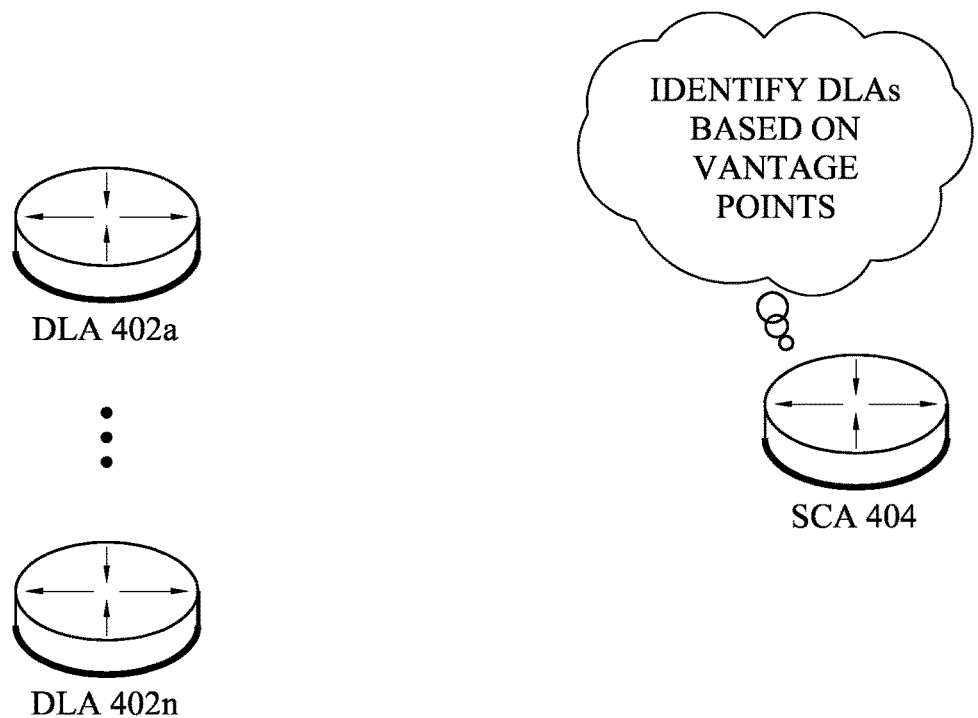
FIGS. 6A-6D illustrate examples of white labels being deployed in a network.

Referring now to FIGS. 6A-6D, examples are shown of white labels being deployed in a network, according to various embodiments. In some embodiments, the DLAs to receive a particular white label may be selected based on their vantage points in the network. For example, as shown in FIG. 6A, SCA 404 may identify which of DLAs 402a-402n share the same vantage point as the DLAs that reported the anomalous behavior leading to the creation of a white label. In general, vantage points associated with the DLAs may be split into several groups, whereby the DLAs in any given group are expected to observe similar network behaviors. For example, DLAs may be split into the following groups: branch routers, data center routers, and office building routers. In one embodiment, the association of a router or other device hosting a DLA to a particular group can be done statically through a policy server. Alternatively, the same process can be carried out by using ML techniques (e.g. by clustering the features of the traffic observed by the routers).

In further embodiments, the selection of DLAs to receive a white label may be based in part on information regarding the routing topology. Notably, this may be particularly suitable for detection of traffic anomalies. If the filtering mechanism is used in a centralized manner (e.g., all anomaly alerts are forwarded to the white label mediator), it may be beneficial to take into account the actual network resources and routing topology, to determine whether white label filtering should be activated on a specific location. Indeed, as noted previously, the overhead of the control plane traffic generated by the anomaly reports (and potentially augmented with contextual information) may be more than negligible. For example, such a situation may occur in constrained networks such as LLNs, multi-tiered WAN architectures where potentially hundreds of remote locations are connected to a data center via an aggregated router or switched layer, or the like.

To facilitate the collection of topology information regarding the network, a centralized device may be configured to act as an Anomaly Reporting Topology Manager (ARTM) (e.g., by executing reporting and topology manager process 246). For example, the label mediator or another centralized device may also act as the ARTM. In other embodiments, the ARTM may be a different device that provides the collected topology information to the label mediator.

Generally, the ARTM may perform any or all of the following functions:

Retrieving the routing topology. In one embodiment, this can be performed by participating to the routing topology without forwarding (e.g., with ISIS by setting the overload bit).

Gathering link resource information. Such information can be gathered thanks to the routing protocol (e.g. MPLS TE), or simply by issuing SNMP v2/v3 commands in order to retrieve the link congestion states.

Evaluating the overall traffic on per white label basis.

Figure 6B:
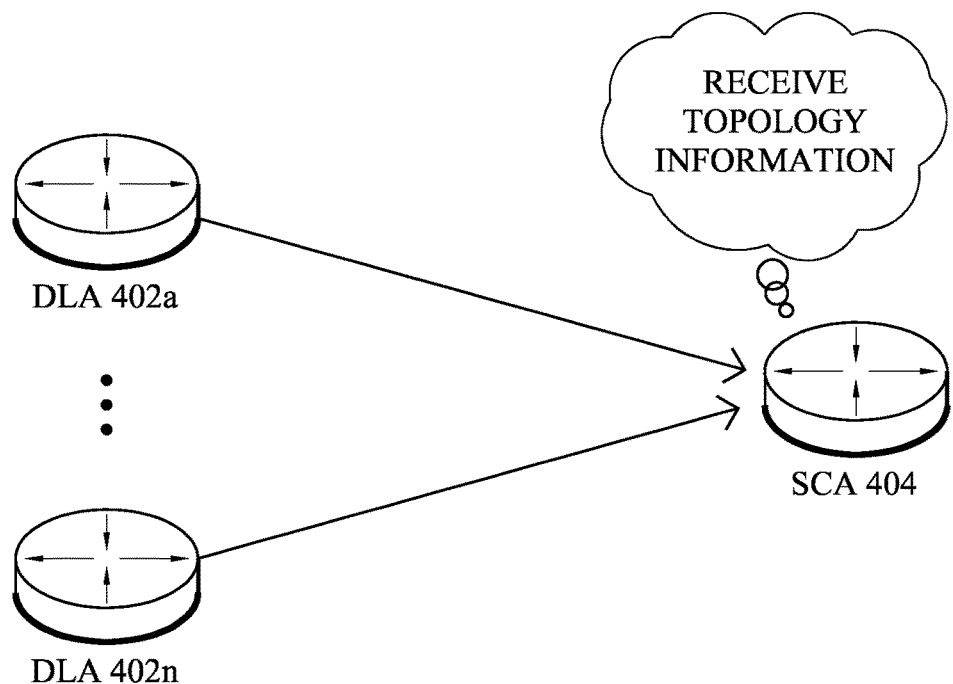
Figure 6C:
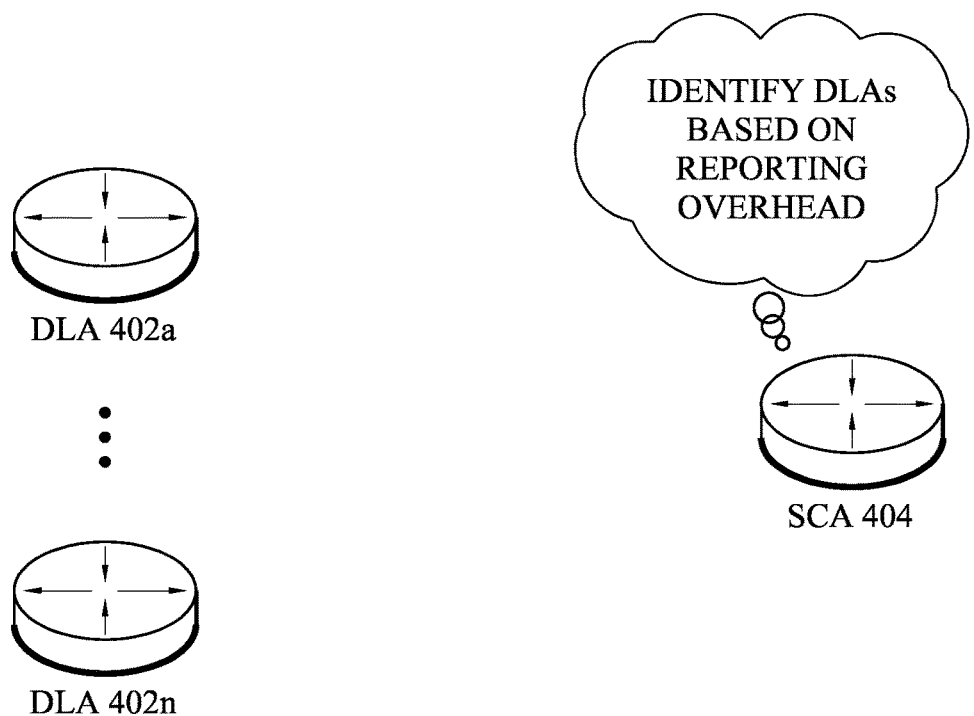

Based on the above functions, the ARTM may then compute the total amount of overhead related to each anomaly per white label and correlate this information with the routing topology and link congestion state. For example, as shown in FIG. 6B, SCA 404 may act as the ARTM and receive topology information from the devices in the network. In turn, as shown in FIG. 6C, SCA 404 may identify one or more DLAs to receive a white label filter based on the received topology information.

In another example, if n-number of remote locations sent their traffic through a second-tier aggregation node K, and the traffic related to a specific white label W1 exceeds some thresholds in terms of percentage of available bandwidth, the ARTM may decide to download a local alert filter for W1 to node K, in order to reduce the bandwidth utilization rate for that anomalies related to the white label W1.

Figure 6D:
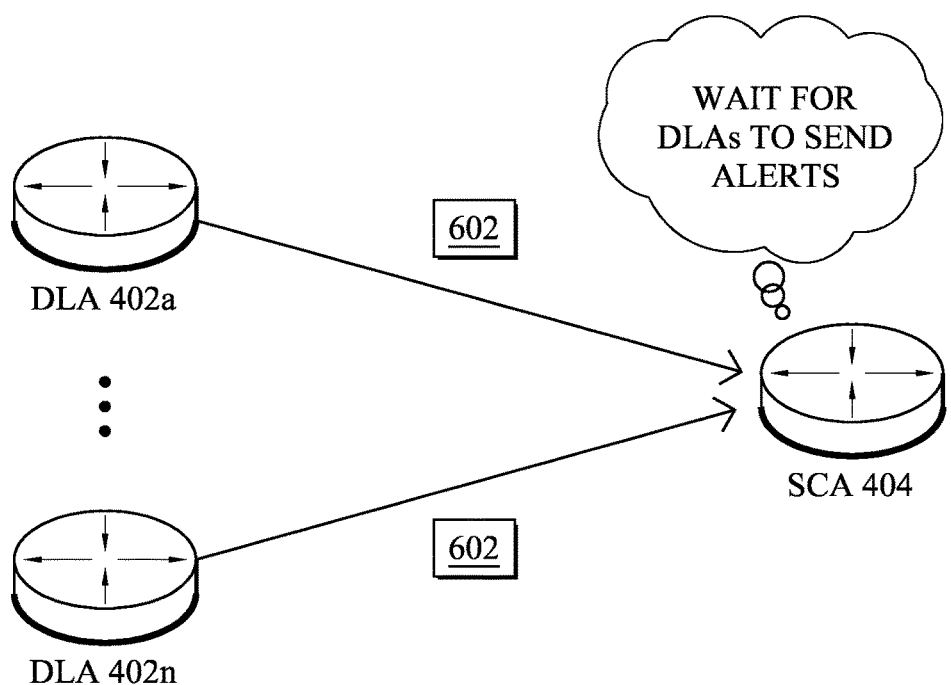

In yet another embodiment, the installation of the white labels on the interested nodes can be carried out by using a "lazy" approach. In such an approach, behavioral white labels may be installed on new DLAs only after these DLAs have raised an anomaly matching this label. For example, as shown in FIG. 6D, SCA 404 may wait to receive an alert 602 from any of DLAs 402a-402n, before determining whether the corresponding white label should be installed on the reporting device.

During operation, the "lazy" approach may proceed as follows. When an anomaly is reported by one of the DLAs, the alarm, which may be augmented with contextual data, is preliminary submitted to the white label mediator. In turn, the mediator may compare the received data with the white label signatures that have already been approved for use in the network (e.g., by a network administrator, etc.). In particular, the specific criteria defining whether the received alarm is already covered by an existing white label may depend on the particular anomaly detection model in use by the DLA. For example, if the white labels actually represent a region of the n-dimensional feature space (as in the case where SVM models are adopted) the degree of superposition between the region associated with the incoming anomaly and those associated with the white labels can be used as a matching criterion. In another example, if the anomalies and white labels are expressed as multi-variable probability distributions, the statistical distance between the incoming anomaly and the existing white labels can be used. Notably, several definitions of statistical distance, such as the Kullback-Leibler divergence, can be used by this technique.

If the alarm matches any of the existing white labels, the label mediator may perform any or all of the following. In some cases, the mediator may prevent the system from asking the user for feedback (e.g., based on the assumption that user feedback was already incorporated into the existing white label). The mediator may also optionally log the suppression of the alert. In addition, the mediator may send a message to the DLA that detected the anomaly that includes the matched white label. The receiving DLA may then use the white label with its local alert filter, to prevent the DLA from raising another anomaly alert fi the same anomaly is detected. Note that white label may have a specific and configurable life time and may be suppressed after the expiration of a specified timer, in some cases.

Figure 7A:
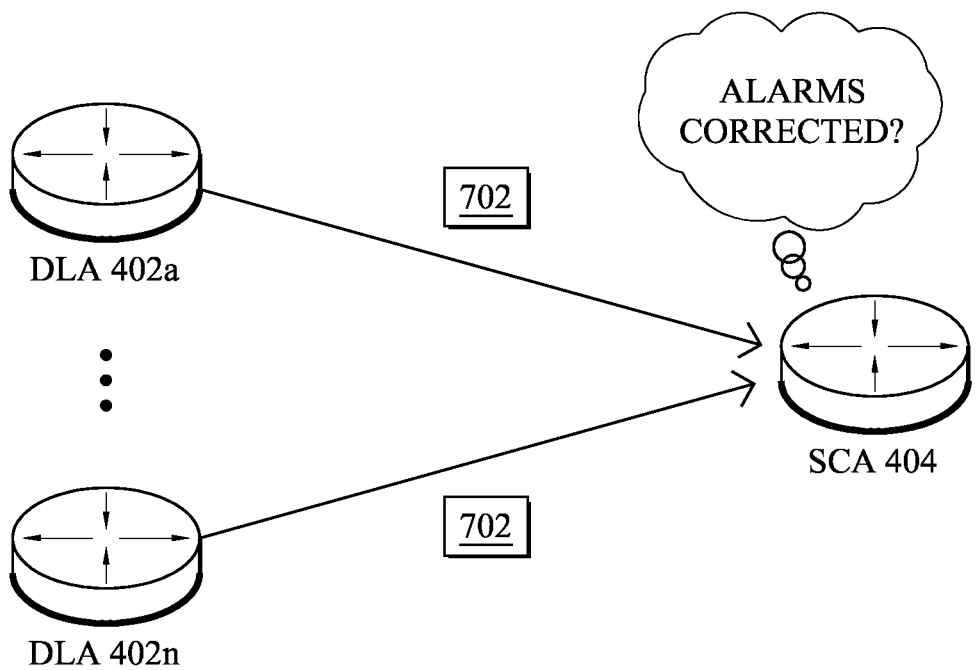
FIGS. 7A-7B illustrate an example of alarms being correlated.
Figure 7B:
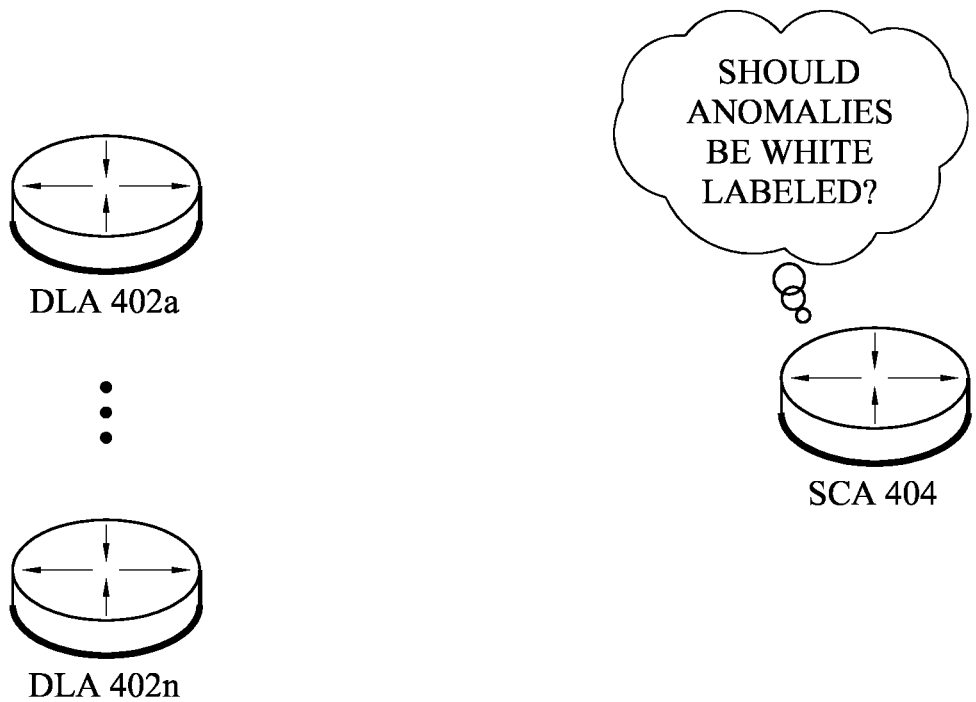

Referring now to FIGS. 7A-7B, an example of alarms being correlated is shown, according to various embodiments. In some embodiments, a device in the network may be configured to operate as a central alarm coordinator (CAC) (e.g., by executing alarm coordinator process 247). For example, as shown in FIG. 7A, SCA 404 or another device may be operable to determine whether alarms 702 reported by DLAs 402a-402n are correlated. In some cases, the CAC mechanism may be explicitly enabled by a user for a particular class of anomalies. Notably, certain types of anomalies may result in certain behaviors that individually may appear normal to an expert, but could indicate the presence of malicious phenomena when correlated together.

In one example, one type of anomaly that may be prone to mislabeling is a fast flux network attack. In such an attack, a number of infected nodes distributed across the network may attempt to access a layer of proxy hosts by hiding a command and control server. In such a case, the communications by each of the infected hosts may be deemed normal (e.g., by a network administrator), leading to the creation of white labels for these behaviors. However, correlation of the anomaly alerts may show that all of the infected hosts are attempting to access a particular device with the same domain name, which may lead to the administrator reconsidering the decision to white label the behaviors. This particular functionality allows the user to be notified about an anomaly only if the anomaly is detected consistently across a number of different edge vantage points.

The CAC may be a centralized and stateful component of the architecture that may be co-located with the white label mediator or on another device in communication therewith. If the user chooses to activate a policy that causes alarms to be filtered through the CAC for a particular anomaly, a white label descriptor may be installed on the relevant DLAs (e.g., for the choice of the particular subset of DLAs, any of the previously described mechanisms can be adopted). Such a descriptor may include the address of the CAC and a particular anomaly label. In turn, whenever the DLA detects an anomaly that fits this label, the DLA may send a message to the CAC that includes the associated anomaly label and/or any ancillary information (e.g., the involved IP addresses, the queried domain if the anomaly was detected based on DNS data, etc.).

The CAC may keep state about all of the reported anomalies carrying the same label. In some cases, the CAC may use a sliding window model to refine which reports are correlated (e.g., alerts received within a particular timeframe). The correlation criterion and/or and the associated thresholds used by the CAC may be configurable parameters, in some embodiments. For example, in the fast flux case, the user may configure the CAC to raise an alarm if half of the suspected DNS queries correspond to the same domain. In case the correlation criterion is met, the CAC will send an notification to the white label mediator process (which may or may not be co-located on the same device). In turn, the white label mediator may determine whether the reported behaviors/anomalies should be white labeled. For example, as shown in FIG. 7B, SCA 404 may determine whether or not the anomalies reported via alarms 702 should be white labeled based on their correlation by the CAC. In some cases, SCA 404 may make this determination by presenting the correlation results to a user interface device and receiving feedback from a user in response.

Figure 8:
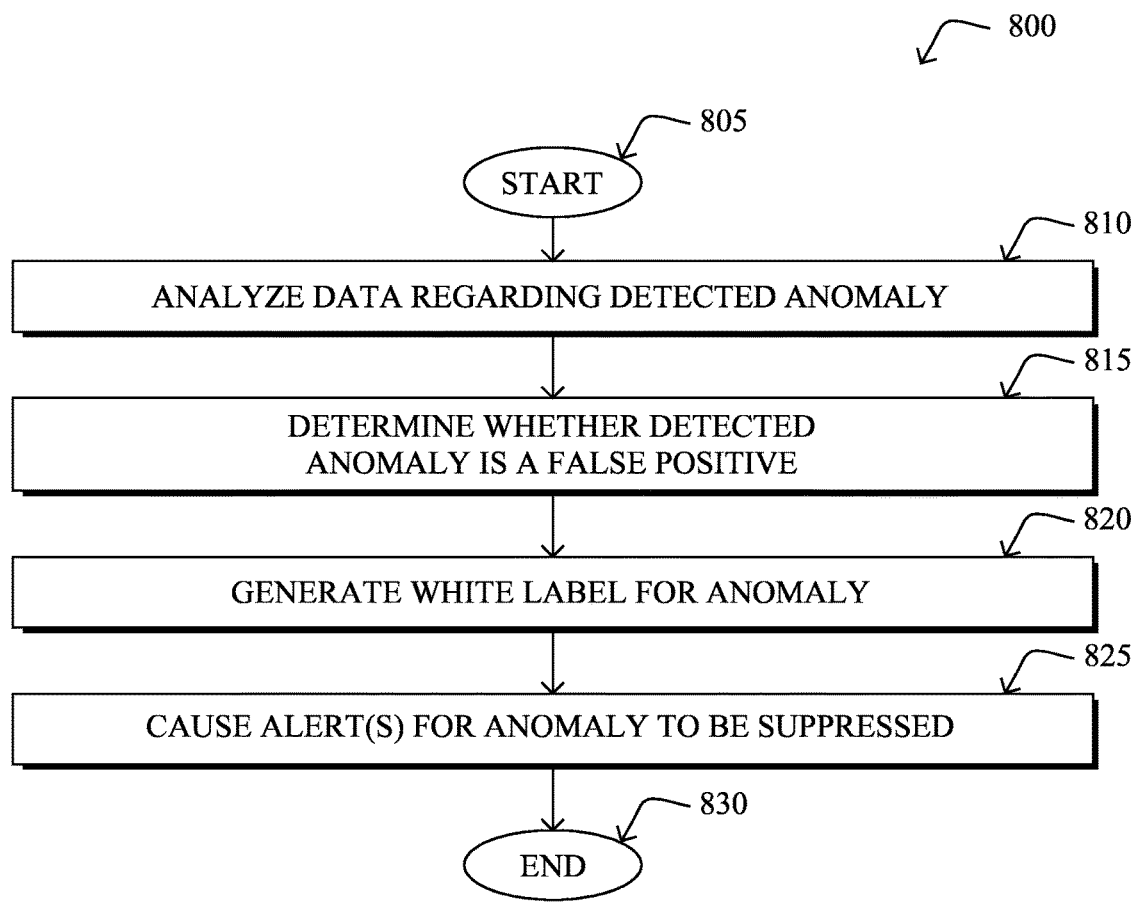
FIG. 8 illustrates an example simplified procedure for dynamically installing behavioral white labels in a network.

FIG. 8 illustrates an example simplified procedure for dynamically installing behavioral white labels in a network, in accordance with one or more embodiments described herein. The procedure 800 may start at step 805, and continues to step 810, where, as described in greater detail above, the device may analyze data regarding a detected anomaly in the network. For example, in some cases, the device may receive an alert message from a DLA in the network indicating that the DLA detected the anomaly. Such a message may also include contextual information regarding the detected anomaly (e.g., data regarding the network behavior that triggered the anomaly alert).]

At step 815, as described in greater detail above, the device may determine whether the detected anomaly is a false positive. In other words, the device may determine whether behavior labeled as anomalous is otherwise normal behavior. For example, installation of a new application in the network may cause a DLA to label the corresponding network behavior as anomalous, despite being legitimate behavior. In one embodiment, the device may make the false positive determination based on feedback from a human expert. Notably, the device may provide data regarding the anomaly to a user interface and, in response, receive an indication from the user as to whether or not the detected anomaly is a false positive. In another embodiment, the device may base the false positive determination on a correlation between anomaly detection alerts from different devices in the network.

At step 820, the device may generate a white label for the anomaly based on a determination that the detected anomaly is a false positive, as detailed above. Generally, such a white label may be used by a filtering process to prevent the generation or forwarding of an alert associated with the particular anomaly. For example, if the white label is installed on a DLA, the DLA may compare a detected anomaly to the white label and determine that an alert should be generated for the anomaly.

At step 825, as described in greater detail above, the device may cause one or more alerts to be suppressed for the anomaly. In some embodiments, the device may suppress the alerts in a centralized manner using the generated white label. For example, if the device receives alerts for anomalous behavior that matches the white label, the device may suppress the alerts from being passed to a network administrator. In other embodiments, the device may cause the alerts to be suppressed by sending the white label to any number of DLAs in the network, thereby allowing filtering mechanisms on the DLAs to suppress the alerts locally by matching the detected anomaly to the installed white label. The device may select the device to receive the white label based on the vantage points of the DLAs, the topology of the network, in a "lazy" manner (e.g., in response to first receiving an alert from a particular DLA that matches the white label, etc., according to various embodiments. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a reduction in the number of anomaly detection alerts in a network. In some cases, a network administrator or other user may only be alerted for purposes of deciding whether or not a particular behavior is legitimate and an alert suppression filter should be installed. In some cases, alert filtering may be performed at the edge of the network, thus reducing the associated traffic overhead. In addition, techniques herein allow for the automatic selection of nodes at which a white label filter is to be installed. Further, alerts may be correlated to determine whether an underlying cause exists and, if so, the corresponding alerts may be re-enabled.

While there have been shown and described illustrative embodiments that provide for white labeling anomalous network behavior to suppress anomaly alerts, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
analyzing, by a device in a network, data regarding a detected anomaly at a distributed learning agent (DLA) of a plurality of DLAs in the network;

determining, by the device, whether the detected anomaly is a false positive;

generating, by the device, a white label for the detected anomaly based on a determination that the detected anomaly is a false positive;

selecting, by the device, a subset of the plurality of DLAs to receive the white label based on each DLA of the subset observing traffic in the network from similar vantage points, wherein the subset of DLAs is selected based on topology information regarding the network and potential network overhead attributable to the one or more distributed learning agents sending alerts in response to detecting the anomaly; and causing, by the device, one or more alerts regarding the detected anomaly to be suppressed at the subset of DLAs using the generated white label for the anomaly.

2. The method as in claim 1, wherein analyzing the data regarding the detected anomaly comprises:
receiving, at the device, the data regarding the detected anomaly from the DLA via an anomaly detection alert.

3. The method as in claim 1, wherein determining whether the detected anomaly is a false positive comprises:
providing, by the device, the data regarding the detected anomaly to a user interface; and
receiving, at the device, an indication as to whether or not the detected anomaly is a false positive.

4. The method as in claim 1, wherein the white label is configured to cause the subset of DLAs in the network to at least one of:
suppress every alert matching the white label, suppress alerts matching the white label sent at a rate that is below a threshold alert rate, or suppress alerts matching the white label for a time period.

5. The method as in claim 1, further comprising:
selecting, the subset of DLAs to receive the white label based on the device receiving one or more alerts regarding the anomaly from the one or more selected distributed learning agents.

6. The method as in claim 1, wherein causing the one or more alerts regarding the detected anomaly to be suppressed comprises:
suppressing, by the device, an alert received by the device regarding the anomaly based on the generated white label.

7. The method as in claim 1, wherein determining whether the detected anomaly is a false positive comprises:
determining, by the device, whether the detected anomaly is correlated to one or more other detected anomalies in the network.

8. An apparatus, comprising:
one or more network interfaces to communicate with a network;
a processor coupled to the network interfaces and adapted to execute one or more processes; and
a memory configured to store a process executable by the processor, the process when executed configured to:
analyze data regarding a detected anomaly at a distributed learning agent (DLA) of a plurality of DLAs in the network;
determine whether the detected anomaly is a false positive;
generate a white label for the detected anomaly based on a determination that the detected anomaly is a false positive;
select a subset of the plurality of DLAs to receive the white label based on each DLA of the subset observing traffic in the network from similar vantage points, wherein the subset of DLAs is selected based on topology information regarding the network and potential network overhead attributable to the one or more distributed learning agents sending alerts in response to detecting the anomaly; and
cause one or more alerts regarding the detected anomaly to be suppressed at the subset of DLAs using the generated white label for the anomaly.

9. The apparatus as in claim 8, wherein the apparatus analyzes the data regarding the detected anomaly by receiving the data regarding the detected anomaly from the DLA via an anomaly detection alert.

10. The apparatus as in claim 8, wherein the apparatus determines whether the detected anomaly is a false positive by:
providing the data regarding the detected anomaly to a user interface; and
receiving an indication as to whether or not the detected anomaly is a false positive.

11. The apparatus as in claim 8, wherein the white label is configured to cause the subset of DLAs to at least one of: suppress every alert matching the white label, suppress alerts matching the white label sent at a rate that is below a threshold alert rate, or suppress alerts matching the white label for a time period.

12. The apparatus as in claim 8, wherein the process when executed further configured to:
select the subset of DLAs to receive the white label based on the device receiving one or more alerts regarding the anomaly from the one or more selected distributed learning agents.

13. The apparatus as in claim 8, wherein the apparatus is configured to suppress locally an alert received by the apparatus regarding the anomaly based on the generated white label.

14. The apparatus as in claim 8, wherein the apparatus determines whether the detected anomaly is a false positive by determining whether the detected anomaly is correlated to one or more other detected anomalies in the network.

15. A tangible, non-transitory, computer-readable media having software encoded thereon, the software when executed by a processor configured to:
analyze data regarding a detected anomaly at a distributed learning agent (DLA) of a plurality of DLAs in the network;
determine whether the detected anomaly is a false positive;
generate a white label for the detected anomaly based on a determination that the detected anomaly is a false positive;
select a subset of the plurality of DLAs to receive the white label based on each DLA of the subset observing traffic in the network from similar vantage points, wherein the subset of DLAs is selected based on topology information regarding the network and potential network overhead attributable to the one or more distributed learning agents sending alerts in response to detecting the anomaly; and
cause one or more alerts regarding the detected anomaly to be suppressed at the subset of DLAs using the generated white label for the anomaly.

16. The tangible, non-transitory, computer-readable media as in claim 15, wherein the white label is configured to cause the subset of DLAs to at least one of: suppress every alert matching the white label, suppress alerts matching the white label sent at a rate that is below a threshold alert rate, or suppress alerts matching the white label for a time period.

17. The tangible, non-transitory, computer-readable media as in claim 15, wherein the process when executed further configured to:
  select the subset of DLAs to receive the white label based on the device receiving one or more alerts regarding the anomaly from the one or more selected distributed learning agents.

* * * * *